(12) United States Patent
Otsuka et al.

(10) Patent No.: US 10,962,352 B2
(45) Date of Patent: *Mar. 30, 2021

(54) SHEET AND STRUCTURAL DEFORMATION-EVALUATING ARTICLE

(71) Applicant: 3M INNOVATIVE PROPERTIES COMPANY, St. Paul, MN (US)

(72) Inventors: Kaoru Otsuka, Tokyo (JP); Norihisa Watanabe, Kanagawa (JP); Hitoshi Morimoto, Kanagawa (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 524 days.

This patent is subject to a terminal disclaimer.

(21) Appl. No.: 15/127,467

(22) PCT Filed: Mar. 17, 2015

(86) PCT No.: PCT/US2015/020868
§ 371 (c)(1),
(2) Date: Sep. 20, 2016

(87) PCT Pub. No.: WO2015/142779
PCT Pub. Date: Sep. 24, 2015

(65) Prior Publication Data
US 2018/0356211 A1 Dec. 13, 2018

(30) Foreign Application Priority Data
Mar. 20, 2014 (JP) .................. 2014-058434

(51) Int. Cl.
*G01B 11/16* (2006.01)
(52) U.S. Cl.
CPC .................. *G01B 11/165* (2013.01)

(58) Field of Classification Search
CPC ..... G01B 11/16; G01B 11/161; G01B 11/165; G01L 1/24
See application file for complete search history.

(56) References Cited

U.S. PATENT DOCUMENTS

| | | | | |
|---|---|---|---|---|
| 10,295,332 | B2* | 5/2019 | Nakayama | G01L 1/24 |
| 2010/0045027 | A1* | 2/2010 | Whiteman | B44F 1/10 |
| | | | | 283/107 |

(Continued)

FOREIGN PATENT DOCUMENTS

| | | |
|---|---|---|
| DE | 3120653 | 12/1982 |
| JP | H10-082614 | 3/1998 |

(Continued)

OTHER PUBLICATIONS

International Search Report for PCT International Application PCT/US2015/020868, dated May 13, 2015, 3pgs.

(Continued)

*Primary Examiner* — Violeta A Prieto
(74) *Attorney, Agent, or Firm* — Michael Stern

(57) ABSTRACT

Problem: To provide a sheet and a structural deformation-evaluating article comprising the same that allow for convenient and quantitative three-dimensional inspection of the deformation of an object. Resolution means: A sheet comprising a deformation-conforming section comprising a first pattern image, a deformation-non-conforming section comprising a second pattern image, and a deformation-mitigating section present between the deformation-conforming section and the deformation-non-conforming section, the first pattern image being visible through the second pattern image; and a structural deformation-evaluating article comprising the sheet are provided.

10 Claims, 5 Drawing Sheets

(56) References Cited

U.S. PATENT DOCUMENTS

| | | | | |
|---|---|---|---|---|
| 2011/0170184 A1* | 7/2011 | Wolk | ............... | G02B 27/2214 |
| | | | | 359/463 |
| 2011/0176325 A1* | 7/2011 | Sherman | ............. | G02B 6/0045 |
| | | | | 362/551 |
| 2012/0176629 A1* | 7/2012 | Allen | ................ | G01D 5/34746 |
| | | | | 356/616 |
| 2016/0169664 A1* | 6/2016 | Hayashi | ............. | G02F 1/13718 |
| | | | | 356/34 |
| 2017/0146338 A1* | 5/2017 | Allen | ................ | G01B 11/165 |
| 2018/0274908 A1* | 9/2018 | Nakayama | ............... | G01L 1/24 |
| 2018/0329207 A1* | 11/2018 | Sitter | ................ | G02B 5/0215 |

FOREIGN PATENT DOCUMENTS

| | | |
|---|---|---|
| JP | 2006-028224 | 2/2006 |
| JP | 2009-249485 | 10/2009 |
| JP | 2009-264852 | 11/2009 |
| JP | 2010-271253 | 12/2010 |
| JP | 2011-191282 | 9/2011 |
| JP | 2012-093260 | 5/2012 |
| JP | 2012-247229 | 12/2012 |
| WO | 2011-034910 | 3/2011 |
| WO | 2013-143008 | 10/2013 |

OTHER PUBLICATIONS

Bangjin, Large Strain Measurement Method and Its Applications, 1996, No. 2, pp. 30-36.

* cited by examiner

SHEET AND STRUCTURAL DEFORMATION-EVALUATING ARTICLE

TECHNICAL FIELD

The present disclosure relates to a sheet and a structural deformation-evaluating article comprising the sheet.

BACKGROUND

Various methods of detecting warping, damage, and the like in structures or the like have been proposed. For example, deformation in concrete walls forming constituent elements of structures or the like can cause severe damage to the constituent elements. Conventionally known methods of monitoring the advancement of such deformation including measurement using a strain gauge or ruler. However, such methods involve the possibility of measurer-induced deviations in measured values (i.e., measurement error) due to involving the use of a strain gauge or ruler, and do not fully satisfy the requirement of accurate detection of deformation. In addition, the measurement must be performed in the vicinity of the object of measurement. Thus, there is a demand for a method that is convenient and allows for the accurate measurement of deformation without the need to approach the object being measured.

Patent document 1 discloses a Moiré pattern utilizing displacement measurement method in which a Moiré pattern is used to measure infinitesimal relative displacement between two points, wherein a grating having a spatially periodic structure is displayed on two plate-shaped parts of a measurement apparatus comprising two plate-shaped members disposed overlapping each other along an object of measurement, and the amount of movement of the Moiré pattern created by optical interference between the two gratings is read to measure the displacement of the object of measurement.

Patent document 2 discloses an infinitesimal displacement measurement apparatus that uses a Moiré pattern to measure infinitesimal displacement of an observed point, the apparatus being provided with a photographing means for remotely photographing a tangible grating having a spatially periodic structure disposed at the observed point, a conversion means for converting the photographed output of the photographing means to a digital signal and outputting tangible grating image data, and an image processing means for adding and averaging separately created reference grating image data and the tangible grating image data outputted from the conversion means and outputting Moiré pattern image data.

Patent document 3 discloses an infinitesimal displacement display device provided with an immobile Moiré slit plate directly or indirectly attached to an object of measurement and provided with a plurality of parallel lines, an oscillation-transmitting member directly or indirectly attached to the object of measurement, an oscillator affixed to the oscillation-transmitting member, and a mobile Moiré slit plate affixed to the oscillator and provided with a plurality of parallel lines; the immobile Moiré slit plate and the mobile Moiré slit plate being overlapped so that the parallel lines are at different angles, forming a Moiré pattern; the mobile Moiré slit plate being slid by displacement of the oscillator caused by the oscillation of the object of measurement transmitted by the oscillation-transmitting member; and the displacement of the Moiré pattern being displayed at a larger size than the displacement of the oscillator.

Patent document 4 discloses a concrete crack sensor constituted by a sensor comprising a fiber-containing plastic plate formed by impregnating a sheet-like fiber with a matrix resin, and an adhesive member for bonding the fiber-containing plastic plate to a concrete surface, the fiber-containing plastic plate being bonded, using the adhesive member, astride a crack in concrete being measured to allow the growth of the crack to be detected on the basis of a whitened part formed by expansion in the width of the crack.

PATENT DOCUMENTS

Patent Document 1: Japanese Unexamined Patent Application Publication No. 2011-191282A
Patent Document 2: Japanese Unexamined Patent Application Publication No. H10-082614A
Patent Document 3: Japanese Unexamined Patent Application Publication No. 2010-271253A
Patent Document 4: Japanese Unexamined Patent Application Publication No. 2012-093260A

SUMMARY

Problems to be Solved

However, a method of simply and quantitatively inspecting the distortion of an object in three dimensions has not yet been proposed.

The present disclosure was conceived in order to solve the problem described above, and has an object of providing a sheet and a structural deformation-evaluating article comprising the same that allow for convenient and quantitative inspection of the three-dimensional displacement of an object.

Means for Solving the Problem

One aspect of the present disclosure provides:
a sheet comprising:
a deformation-conforming section comprising a first pattern image;
a deformation-non-conforming section comprising a second pattern image; and
a deformation-mitigating section present between the deformation-conforming section and the deformation-non-conforming section;
the first pattern image being visible through the second pattern image.

Another aspect of the present disclosure provides a structural deformation-evaluating article comprising the sheet.

Technical Effect

In accordance with the present disclosure, a sheet and a structural deformation-evaluating article comprising the same that allow for convenient and quantitative three-dimensional inspection of the deformation of an object are provided.

BRIEF DESCRIPTION OF THE DRAWINGS

FIG. 4A is a top-down view, and FIG. 4B is a side view.

Figure 1B:
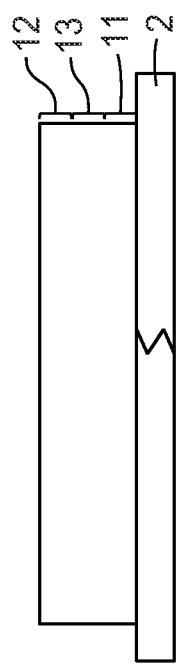
FIGS. 1A and 1B illustrate an example of a sheet according to one aspect of the present disclosure before and after deformation.

An exemplary aspect of the present invention will be described hereafter, but the present invention is not limited to the following aspect, and various modifications within the spirit and scope of the claims are comprehended in the present invention.

One aspect of the present disclosure provides: a sheet comprising:

a deformation-conforming section comprising a first pattern image;

a deformation-non-conforming section comprising a second pattern image; and a deformation-mitigating section present between the deformation-conforming section and the deformation-non-conforming section;

the first pattern image being visible through the second pattern image.

FIGS. 1-3 are illustrations of an example of a sheet according to an aspect of the present disclosure, showing a sheet 1 affixed to an object 2. Referring to FIGS. 1 to 3, the sheet 1 comprises a deformation-conforming section 11, a deformation-non-conforming section 12, and a deformation-mitigating section 13 present therebetween. In a typical aspect, as shown in FIGS. 1 to 3, the deformation-conforming section and the deformation-non-conforming section of the sheet are present on first and second primary surfaces of the sheet.

In the present disclosure, the deformation-conforming section is a section having the capability of conforming to a displacement of an object and being displaced by the displacement of the object occurring while the sheet is affixed to the object.

In the present disclosure, the deformation-non-conforming section is a section that does not substantially conform to displacement occurring in the deformation-conforming section, and thus is not substantially displaced.

In the present disclosure, the deformation-mitigating section is a section having deformation-mitigating ability sufficient to keep the deformation-non-conforming section from being substantially displaced by the displacement of the deformation-conforming section.

The sheet may be constituted by a single layer or multiple layers. The sheet comprises a deformation-conforming section, a deformation-non-conforming section, and a deformation-mitigating section. Accordingly, in one embodiment, the sheet is a single layer comprising a deformation-conforming section, a deformation-non-conforming section, and a deformation-mitigating section by imparting the single layer with suitable thickness and physical properties. In another embodiment, the sheet is constituted by multiple layers of different materials, thicknesses, and the like, each of the layers being capable of functioning as a deformation-conforming section, a deformation-non-conforming section, and a deformation-mitigating section, respectively. As an example, the sheet can be constituted by two layers, one functioning as a deformation-conforming section and a deformation-mitigating section and one functioning as a deformation-non-conforming section, or by two layers, one functioning as a deformation-conforming section and one functioning as a deformation-mitigating section and a deformation-non-conforming section. As discussed above, the layer configuration of the sheet can be designed as desired on the condition that the sheet comprises sections that function as a deformation-conforming section, a deformation-non-conforming section, and a deformation-mitigating section. For example, FIG. 1 illustrates an example in which the sheet is single-layered, and FIGS. 2 and 3 illustrate examples in which the sheet has three layers (for example, a stretchable layer, a non-stretchable layer, and a viscoelastic layer, described hereafter).

The deformation-conforming section comprises a first pattern image, and the deformation-non-conforming section comprises a second pattern image. The sheet according to the present disclosure is configured so that the Moiré pattern formed by the first pattern image and the second pattern image is detectable. More specifically, the first pattern image is visible through the second pattern image. In this context, the first pattern image being visible through the second pattern image means that when the first and second pattern images are viewed from the second pattern image side, the first pattern image is visually perceptible along with the second pattern image, through the side upon which the first pattern image is disposed and the side upon which the second pattern image is disposed of the sheet. The means by which the first pattern image is made visually perceptible can be selected as desired; one example is photographing the pattern image under visible light using various types of camera. With the configuration in which the first pattern image is visible through the second pattern image, the Moiré pattern formed by interference between the first pattern image and the second pattern image is also visible, allowing the three-dimensional displacement of the object to be evaluated based on the Moiré pattern.

Accordingly, the sheet according to the present disclosure enables convenient and quantitative three-dimensional evaluation of deformation in an object. In the present disclosure, being capable of three-dimensional evaluation of deformation in an object indicates that displacement in all directions of the object can be evaluated; i.e., displacement in each of mutually orthogonal directions X, Y, and Z, as well as in any direction constituted by a combination of two or more of these directions can be evaluated. Being capable of quantitative evaluation indicates that the level of displacement in an object can be detected, and that measurement error caused, for example, by a measurer is suppressed. Being capable of convenient evaluation indicates, for example, the ability to evaluate displacement remotely without having to approach the object.

In a preferred embodiment for making the first pattern image visible through the second pattern image, the part of the sheet according to the present disclosure reaching from the first pattern image through the second pattern image to the surface of the sheet is typically constituted by a transparent material. In the present disclosure, "transparent material" refers to a material having a transmittance of at least 30, more preferably at least 80, at light wavelengths of 380 to 750 nm. The "transmittance" referred to here is the value for total light transmittance as measured using a haze meter (such as an NDH 2000 haze meter, manufactured by Nippon Denshoku Industries Co., Ltd. (Bunkyo-ku, Tokyo)).

Figure 1A:
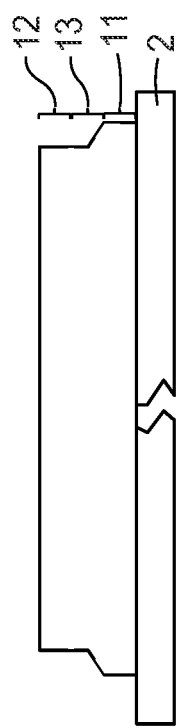
Figure 2A:
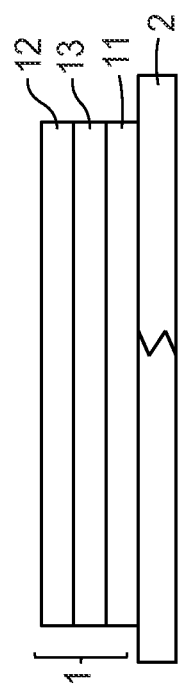
FIGS. 2A and 2B illustrate an example of a sheet according to one aspect of the present disclosure before and after deformation.
Figure 2B:
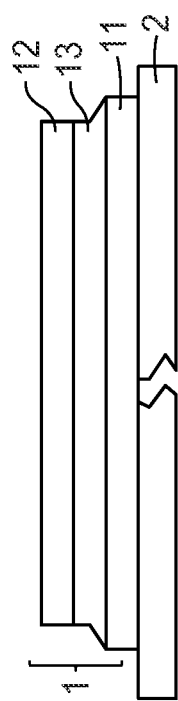
Figure 3B:
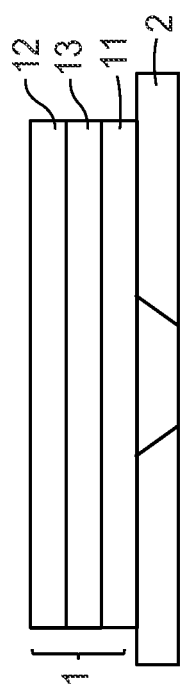
FIGS. 3A and 3B illustrate an example of a sheet according to one aspect of the present disclosure before and after deformation.
Figure 3A:
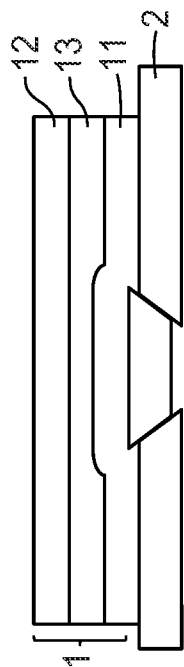

One important characteristic of the sheet according to the present disclosure is that displacement of the deformation-conforming section deforms the first pattern image, and the second pattern image of the deformation-non-conforming section is substantially unaffected by the deformation of the first pattern image, i.e., does not substantially deform. The sheet is capable of three-dimensionally detecting displacement of an object to which it is affixed via the deformation of the first pattern image. Specifically, in-plane displacement of the object such as shown in FIGS. 1 and 2 (FIGS. 1A and 2A show states prior to displacement and FIGS. 1B and 2B show states following displacement), through-thickness displacement of the object such as shown in FIG. 3 (FIG. 3A shows a state prior to displacement and FIG. 3B shows a state following displacement), or combinations thereof generate deformation of the first pattern image. By detecting and analyzing the Moiré pattern generated by the deformation of the first pattern image and the undeformed second pattern image, displacement of the object can be quantitatively evaluated in three dimensions. Locations in the object where displacement has occurred can also be identified.

When using the sheet according to the present disclosure to evaluate the displacement of an object, the Moiré pattern of the sheet is detected. The sheet according to the present disclosure offers the advantage that evaluation can be conveniently performed in that the device used to detect the Moiré pattern need not necessarily be brought within the vicinity of the sheet. In addition, the sheet according to the present disclosure also offers the advantage of being inexpensive, as well as easy to install due to the lack of need for a power source or the like.

Any conventionally known pattern images used to evaluate displacement using a Moiré pattern can be used for the first pattern image and the second pattern image. The specifics of the pattern images, such as the shapes and pitches of the pattern images, can be determined as appropriate according to the target displacement level or the like. Examples of pattern image shapes include a grid, a houndstooth pattern, dots, a plurality of parallel straight lines, and the like. In an exemplary embodiment, the first and second pattern images can be grids having respective pitches of about 0.4 mm to about 0.8 mm. For example, when evaluating deformation of a wall of a structure or the like, detection of displacement of about 0.1 to 2.0 mm is often desired. An example of a pattern image shape and pitch suited to such an application is a sheet, one side of which is about 100 mm long, having a pitch of about 0.3 mm to about 1.0 mm.

In some embodiments, the proportion of the displacement level of the deformation-non-conforming section to 100% displacement of the deformation-conforming section is preferably about 30% or less, about 20% or less, about 10% or less, or about 0%. It is sufficient for the above-described proportion to be exhibited at any desired point in time until at least part of the sheet breaks in a displacement measurement method to be described hereafter. However, in one embodiment, the proportion is exhibited at all times until, for example, at least part of the sheet breaks when the displacement of the deformation-conforming section increases from 0 mm.

In one embodiment, the displacement exhibited by the deformation-non-conforming section when the deformation-conforming section is displaced 10 mm can be about 3 mm or less, about 2.0 mm or less, about 1.0 mm or less, or about 0 mm.

The above-described displacements are each measured according to the following method, or by a method understood as being comparable thereto by a person skilled in the art.

Figure 4B:
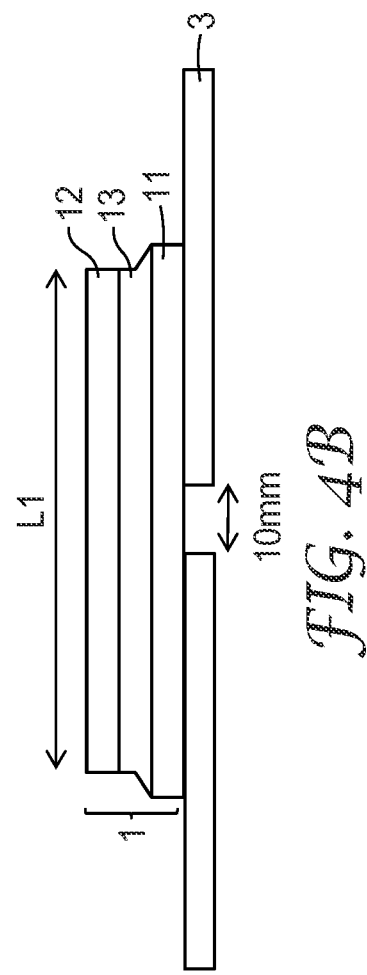
FIGS. 4A and 4B illustrate an example of a method of measuring displacement in a deformation-non-conforming section of the present disclosure, where
Figure 4A:
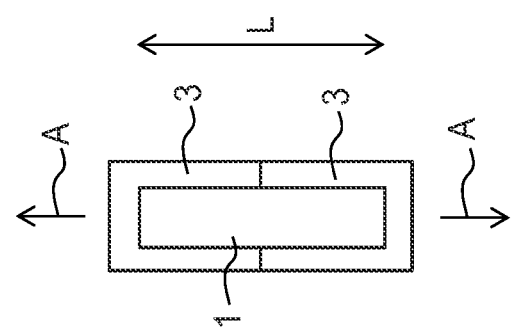

FIG. 4 is an illustration of a method of measuring displacement in the deformation-non-conforming section of the present disclosure, with FIG. 4A being a top-down view, and FIG. 4B being a side view. Referring to FIG. 4, a sheet 1 according to the present disclosure of a predetermined size (such as length 100 mm×width 25 mm) and two rectangular plates 3 (e.g. metal plates such as stainless steel plates or the like) to which the sheet can be affixed are prepared. The surface of the side of the sheet upon which the deformation-conforming section 11 is disposed is affixed to the surfaces of the plates 3 so that the sheet 1 straddles the two plates 3 in the length direction L. The sheet is affixed using an adhesive or the like. The two plates 3 are gripped using clamps (not illustrated) and pulled apart from each other (i.e. in the directions indicated by arrows A in FIG. 4A) at a rate of 5 mm/sec until a predetermined distance therebetween (such as 10 mm) is reached using a tensile tester (such as a Shimadzu Autograph AGS-X, manufactured by Shimadzu Corp. (Kyoto-shi, Kyoto)) as illustrated in FIG. 4B. Pulling operation is continued even if the deformation-conforming section tears for example. The length L1 of the surface of the sheet upon which the deformation-non-conforming section 12 is disposed is measured (at the location of maximal length), and the length of the deformation-non-conforming section 12 prior to testing (for example, 100 mm, as described above) is subtracted therefrom to determine the displacement of the deformation-non-conforming section 12. Displacement in the deformation-non-conforming section being about 30% or less of the displacement of the deformation-conforming section or displacement in the deformation-non-conforming section being about 3 mm or less when the deformation-conforming section is displaced 10 mm both indicate that displacement evaluation based on the Moiré pattern formed by the first pattern image and the second pattern image is satisfactorily precise.

In an exemplary aspect, if the sheet is single-layered, the single layer may be of a material such as polyacrylate. If the single layer is too thin, the deformation-non-conforming section may be deformed by deformation of the deformation-conforming section. Conversely, if the layer is too thick, the first pattern image and the second pattern image may shift depending on the observation angle, reducing the visibility of the Moiré pattern. In view of such considerations, the single layer preferably has a thickness of about 100 µm to about 1.5 mm, or about 500 µm to about 1.0 mm. The single layer preferably has viscous, elastic, or viscoelastic physical properties. In the context of the sheet according to the present disclosure, "single-layered" does not exclude the presence of a layer not substantially contributing to the detection of object deformation, such as an adhesive layer.

In one aspect, the deformation-conforming section comprises a stretchable layer having a first pattern image. In one aspect, the deformation-non-conforming section comprises a non-stretchable layer having a second pattern image. In one aspect, the deformation-mitigating section comprises a viscoelastic layer. In one aspect, the sheet is constituted by a stretchable layer, a non-stretchable layer, and a viscoelastic layer. In this case, the presence of a layer not substantially contributing to the detection of object deformation, such as an adhesive layer, is not excluded.

In a typical aspect, the stretchable layer and the viscoelastic layer are bonded to each other by the adhesiveness of the stretchable layer itself, by the adhesiveness of the adhesive layer itself, by another adhesive layer, or by a combination or two or more of these. In a typical aspect, the viscoelastic layer and the non-stretchable layer are bonded to each other by the adhesiveness of the adhesive layer itself, by the adhesiveness of the non-stretchable layer itself, by another adhesive layer, or by a combination of two or more of these.

The stretchable layer can be made of any material that is sufficiently stretchable to function as a deformation-conforming section. In a specific aspect, the stretchable layer is transparent for the sake of the visibility of the pattern image. In one aspect, the stretchable layer comprises at least one type of polymer selected from the group consisting of polyolefin, olefin copolymers, vinyl copolymers, (meth) acrylic polymers, (meth)acrylic copolymers, and polyurethane. In the present disclosure, "(meth)acrylic" means acrylic or methacrylic.

In one aspect, the stretchable layer comprises (A) a carboxy group-containing (meth)acrylic copolymer and (B) an amino group-containing (meth)acrylic copolymer at an (A):(B) mass ratio of about 10:90 to about 90:10. This can impart the stretchable layer with superior weather resistance and adherend conformability.

In one aspect, the (A) carboxy group-containing (meth) acrylic copolymer can be obtained by copolymerizing a composition comprising a monoethylenically unsaturated monomer and a carboxyl group-containing unsaturated monomer as primary components.

In one aspect, the (B) amino group-containing (meth) acrylic copolymer can be obtained by copolymerizing a composition comprising a monoethylenically unsaturated monomer and an amino group-containing unsaturated monomer as primary components.

Each of the copolymerization of the (A) carboxy group-containing (meth)acrylic copolymer and the (B) amino group-containing (meth)acrylic copolymer is preferably performed via radical polymerization. In such cases, a known polymerization method can be utilized, such as solution polymerization, suspension polymerization, emulsion polymerization, bulk polymerization, or the like. Examples of polymerization initiators include organic peroxides such as benzoyl peroxide, lauroyl peroxide, and bis(4-tertiary butylcyclohexyl) peroxydicarbonate; and azo-based polymerization initiators such as 2,2'-azobis isobutyronitrile, 2,2'-azobis-2-methyl butyronitrile, 4,4'-azobis-4-cyanovalerianate, dimethyl 2,2'-azobis(2-methylpropionate), and azobis 2,4-dimethyl valeronitrile (AVN). It is preferable to use about 0.05 parts by mass to about 5 parts by mass of initiator per 100 parts by mass of the monomer mixture.

It is preferable for the Tg of one of the (A) carboxyl group-containing (meth)acrylic copolymer and the (B) amino group-containing (meth)acrylic copolymer of the stretchable layer to be 0° C. or higher, and the Tg of the other to be 0° C. or lower. This is because the (meth)acrylic copolymer having the higher Tg imparts the stretchable layer with high tensile strength, while the (meth)acrylic copolymer having the lower Tg improves the elongation properties of the stretchable layer.

In one aspect, the respective weight-average molecular weights of the (A) carboxy group-containing (meth)acrylic copolymer and the (B) amino group-containing (meth) acrylic copolymer are about 10,000 or greater, about 50,000 or greater, or about 100,000 or greater, and about 10,000,000 or less or about 1,000,000 or less.

In one aspect, examples of the monoethylenically unsaturated monomer include a monomer represented by the general formula $CH_2=CR_1COOR_2$ (wherein, $R_1$ is hydrogen or a methyl group, and $R_2$ is a straight-chained or branched alkyl group, phenyl group, alkoxyalkyl group, or phenoxyalkyl group), styrene, α-methylstyrene, an aromatic vinyl monomer such as vinyl toluene, or a vinyl ester such as vinyl acetate. Examples of such monomers include phenoxyalkyl (meth)acrylates such as methyl (meth)acrylate, ethyl (meth)acrylate, n-butyl (meth)acrylate, isoamyl (meth) acrylate, n-hexyl (meth)acrylate, 2-ethylhexyl (meth)acrylate, isooctyl (meth)acrylate, isononyl (meth)acrylate, decyl (meth)acrylate, dodecyl (meth)acrylate, and phenoxyethyl (meth)acrylate; and alkoxyalkyl (meth)acrylates such as methoxypropyl (meth)acrylate and 2-methoxybutyl (meth) acrylate. One or more types of monoethylenically unsaturated monomer can be used according to purpose in order to obtain the desired glass transition temperature, tensile strength, and elongation properties.

A (meth)acrylic copolymer having a Tg of 0° C. or higher can easily be obtained, for example, by performing copolymerization using a (meth)acrylic monomer that would yield a homopolymer having a Tg of 0° C. or higher when polymerized alone, such as methyl methacrylate (MMA) or n-butyl methacrylate (BMA), as a primary component.

A (meth)acrylic copolymer having a Tg of 0° C. or less can easily be obtained by performing copolymerization using a component that would yield a homopolymer having a Tg of 0° C. or less when polymerized alone, such as ethyl acrylate (EA), n-butyl acrylate (BA), or 2-ethylhexyl acrylate (2EHA), as a primary component.

The glass transition temperature (Tg) of the (A) carboxyl group-containing (meth)acrylic copolymer and the (B) amino group-containing (meth)acrylic copolymer can be found according to the Fox equation, shown below, assuming that each of the polymers is copolymerized from n types of monomers.

$$1/Tg = X_1/(Tg_1+273.15) + X_2/(Tg_2+273.15) + \ldots + X_n/(Tg_n+273.15)$$

($Tg_1$: glass transition point of homopolymer of component 1
$Tg_2$: glass transition point of homopolymer of component 2
$X_1$: weight fraction of component 1 monomer that is added during polymerization
$X_2$: weight fraction of component 2 monomer that is added during polymerization
$X_1+X_2+\ldots+X_n=1$)

Examples of carboxyl group-containing unsaturated monomers that can be copolymerized with the monoethylenically unsaturated monomer to form a carboxyl group-containing (meth)acrylic copolymer include acrylic acid, methacrylic acid, maleic acid, itaconic acid, ω-carboxy polycaprolactone monoacrylate, phthalic acid monohydroxyethyl (meth)acrylate, β-carboxyethyl acrylate, 2-(meth)acryloyl oxyethyl succinic acid, and 2-(meth)acryloyl oxyethyl hexahydrophthalic acid.

The carboxyl group-containing (meth)acrylic copolymer is preferably obtained by performing copolymerization using a monoethylenically unsaturated monomer as a primary component (specifically, in a range from about 80 parts by mass to about 95.5 parts by mass) and an amount of carboxyl group-containing unsaturated monomer in a range from about 0.5 parts by mass to about 20 parts by mass.

Examples of amino group-containing unsaturated monomers that can be copolymerized with the monoethylenically unsaturated monomer to form an amino group-containing (meth)acrylic copolymer include dialkylaminoalkyl (meth) acrylates such as N,N-dimethylaminoethyl acrylate (DMAEA) or N,N-dimethylaminoethyl methacrylate (DMAEMA); dialkylaminoalkyl (meth)acrylamides such as N,N-dimethylaminopropyl acrylamide (DMAPAA) or N,N-dimethylaminopropyl methacrylamide; and monomers containing tertiary amino groups typified by vinyl monomers comprising nitrogenous heterocycles, such as vinylimidazole.

The amino group-containing (meth)acrylic polymer is preferably obtained by performing copolymerization using a monoethylenically unsaturated monomer as a primary component (specifically, in a range from about 80 parts by mass to about 95.5 parts by mass) and an amount of amino group-containing unsaturated monomer in a range from about 0.5 parts by mass to about 20 parts by mass.

After the carboxyl group-containing (meth)acrylic copolymer and the amino group-containing (meth)acrylic copolymer have been separately polymerized, as described above, the stretchable layer can be formed according to an ordinary film forming method. For example, solutions of the polymers can be mixed, applied to a release surface of a liner, and dried and hardened to form the stretchable layer. The coating apparatus can be an ordinary coater, such as a bar coater, a knife coater, a roll coater, a die coater, or the like. Hardening is performed as in the case of drying a coating material containing a volatile solvent, or cooling a molten resin component. The stretchable layer can also be formed according to a melt-extrusion method.

When forming the stretchable layer, the proportions of the carboxyl group-containing (meth)acrylic copolymer and the amino group-containing (meth)acrylic copolymer can be altered to obtain a stretchable layer having the desired tensile strength and elongation properties. Specifically, out of the carboxyl group-containing (meth)acrylic copolymer and the amino group-containing (meth)acrylic copolymer, the compounding ratio of the polymer having the relatively higher Tg to the polymer having the relatively lower Tg can be about 10:90 to about 90:10, about 20:80 to about 90:10, or about 30:70 to about 90:10. In one aspect, there is a greater amount of the copolymer having the relatively higher Tg than the copolymer having the relatively lower Tg.

In one aspect, the stretchable layer further contains, in addition to the (A) carboxy group-containing (meth)acrylic copolymer and the (B) amino group-containing (meth) acrylic copolymer, (C) a crosslinking agent containing a carboxyl group-reactive functional group. The crosslinking agent contributes to the cross-linkage of the (A) carboxy group-containing (meth)acrylic copolymer and the (B) amino group-containing (meth)acrylic copolymer. Such a cross-linkage forms a net-like structure, further improving the elongation properties of the stretchable layer at low temperatures. Advantageously, crosslinking agents comprising functional groups capable of reacting with carboxyl groups, specific examples including bisamide crosslinking agents (such as RD1054, manufactured by 3M), aziridine crosslinking agents (such as Chemitite® PZ33, manufactured by Nippon Shokubai, and NeoCryl® CX-100, manufactured by Avecia), carbodiimide crosslinking agents (such as Carbodilite™ V-03, V-05, and V-07, manufactured by Nisshinbo), and epoxy crosslinking agents (such as E-AX, E-SXM, and ESC manufactured by Soken Chemical Engineering) can be used. The amount of crosslinking agent used is about 0.1 to about 5 parts by mass per 100 parts by mass of the (A) carboxyl group-containing (meth)acrylic copolymer.

The stretchable layer may further contain one or more types of various additives as desired. Examples of additives include antioxidants, UV absorbers, light stabilizers, plasticizers, lubricants, antistatic agents, flame retardants, fillers, and the like.

In one aspect, the stretchable layer is strong enough not to break as the result of displacement of, for example, a few millimeters. In view of such considerations, the stretchable layer preferably has a tensile strength of about 100 MPa or less. Also in view of such considerations, the stretchable layer may have a thickness of, for example, about 10 µm to about 150 µm, or about 30 µm to about 100 µm.

In one aspect, the stretchable layer comprises first and second primary surfaces, the first pattern image being disposed upon the first primary surface. The first pattern image is, for example, a printed layer. A stretchable layer comprising a printed layer can be formed, for example, by directly printing a desired pattern image onto a surface of a stretchable film formed from a polymer such as those described above, by transferring a printed layer of a desired pattern image formed on a substrate onto the stretchable film, or the like. Printing can be performed via inkjet printing, gravure printing, relief printing, flexographic printing, screen printing, electrostatic copying, dye sublimation transfer printing, or the like. In an exemplary aspect, the stretchable layer and the viscoelastic layer are affixed to each other so that the first primary surface faces the viscoelastic layer. This is advantageous in that the first pattern image is protected by the viscoelastic layer, preventing damage. In another exemplary aspect, the second primary surface may face the viscoelastic layer. In this case, the first pattern image may be protected by a coating layer or the like.

The non-stretchable layer can be made of a desired material that is sufficiently stretch-resistant to function as a deformation-non-conforming section. Out of consideration for the visibility of the pattern image, the non-stretchable layer is typically transparent.

In one aspect, the non-stretchable layer contains at least one polymer selected from the group consisting of polyester, polyolefin, and polyvinyl. The non-stretchable layer is typically a hard film. A commercially obtainable hard film may be used, with examples including films of polyester, polyolefin, polyvinyl, polystyrene, polyacrylate, polymethacrylate, polyimide, polyurethane, polysulfone, polyether, polyacetal, polyphenylene, polyepoxy resin, phenolic resin, nylon, polycarbonate, and the like.

In a typical aspect, the non-stretchable layer may be exposed to the environment during use. Accordingly, the non-stretchable layer preferably has superior weather resistance. In view of such considerations, an example of a preferred non-stretchable layer is made of polyester.

In a typical aspect, the non-stretchable layer is sufficiently strong enough not to be substantially displaced when the stretchable layer is displaced. In view of such considerations, the non-stretchable layer preferably has a tensile strength of about 50 MPa or greater. Also, in view of such considerations, the non-stretchable layer may have a thickness of, for example, about 10 µm to about 150 µm, or about 50 µm to about 100 µm.

In one aspect, the non-stretchable layer comprises first and second primary surfaces, the second pattern image being disposed upon the first primary surface. The second pattern image is, for example, a printed layer. A non-stretchable layer comprising a printed layer can be formed, for example, by directly printing a desired pattern image onto a surface of a non-stretchable film, by transferring a printed layer of a desired pattern image formed on a substrate onto the non-stretchable film, or the like. Printing can be performed via inkjet printing, gravure printing, relief printing, flexographic printing, screen printing, electrostatic copying, dye sublimation transfer printing, or the like. In an exemplary aspect, the non-stretchable layer and the viscoelastic layer are affixed to each other so that the first primary surface faces the viscoelastic layer. This is advantageous in that the second pattern image is protected by the viscoelastic layer, preventing damage. In another exemplary aspect, the second primary surface may face the viscoelastic layer. In this case, the second pattern image may be protected by a coating layer or the like.

The viscoelastic layer can be formed from any viscoelastic material that is capable of attenuating displacement of the deformation-conforming section via elastic deformation, and possesses deformation-mitigating ability sufficient to keep the deformation-non-conforming section from being substantially displaced by the displacement of the deformation-conforming section. Out of consideration for the visibility of the pattern image, the viscoelastic layer is typically clear.

In one aspect, the viscoelastic layer comprises at least one type of polymer selected from the group consisting of polyolefin and olefin copolymers (hereafter collectively referred to as olefin (co)polymers), vinyl copolymers (such as vinyl chloride polymer), (meth)acrylic polymers and (meth)acrylic copolymers (hereafter collectively referred to as (meth)acrylic (co)polymers; examples include poly(meth)acrylate, acrylic acid, and acrylamide copolymers, etc.), polyurethane (such as polyether urethane and polyester urethane), and silicone polymers (such as methylvinyl silicone). The viscoelastic layer may be a layer of rubber, examples of rubber including butane rubber, butyl rubber, and the like.

Examples of raw material monomers for (meth)acrylic (co)polymers include (meth)acrylic monomers comprising a straight-chain or branched alkyl group having from 14 to 22 carbon atoms (hereafter also referred to as $C_{14-22}$ (meth)acrylic monomers), such as isostearyl (meth)acrylate, cetyl (meth)acrylate, n-stearyl (meth)acrylate, n-behenyl (meth)acrylate, isomyristyl (meth)acrylate, and isopalmityl (meth)acrylate.

The raw material monomer may include a carboxyl group-containing monomer such as an unsaturated monocarboxylic acid (such as acrylic acid or methacrylic acid), an unsaturated dicarboxylic acid (such as maleic acid or itaconic acid), ω-carboxy polycaprolactone monoacrylate, phthalic acid monohydroxyethyl (meth)acrylate, β-carboxyethyl acrylate, 2-(meth)acryloyl oxyethyl succinic acid, or 2-(meth)acryloyl oxyethyl hexahydrophthalic acid.

If the raw material monomer contains, for example, a $C_{14-22}$ (meth)acrylic monomer and a carboxyl group-containing monomer, the respective proportions thereof can be about 5% by mass to about 8% by mass of the carboxyl group-containing monomer relative to about 92% by mass to about 95% by mass of the $C_{14-22}$ monomer. The amount of carboxyl group-containing monomer is advantageously at least about 5% by mass, as this will increase the shear storage modulus G' of the viscoelastic layer, improving cohesion. This is also advantageous in terms of displacement mitigation capability, as the loss tangent tan δ will be increased. Meanwhile, in the case where the amount of the carboxyl group-containing monomer is no more than about 8% by mass, it is advantageous that the temperature dependency of the displacement mitigation will be decreased.

Examples of olefin (co)polymers include saturated polyolefins, i.e., polyolefins containing substantially no double bonds or triple bonds between carbon atoms. For example, at least 90% of the carbon-carbon bonds in the saturated polyolefin are preferably single bonds. Examples of saturated polyolefins include polyethylene, polybutene, polypropylene, polyisobutylene, poly(α-olefin), ethylene/propylene copolymer, ethylene/α-olefin copolymer, propylene/α-olefin copolymer, and hydrogenated polybutadiene. These may be used singly or in combinations of two or more types.

An amorphous polymer can also be used for the saturated polyolefin. An "amorphous polymer" is a polymer that either has an extremely low degree of crystallinity or is incapable of entering a crystallized state. In the case of an amorphous polymer, the glass transition temperature is measured, but the melting point is not measured. If an amorphous polymer is used, the shear storage modulus G' of the viscoelastic layer at 0° C. to 40° C. can be adjusted to, for example, $1.5 \times 10^4$ to $5.0 \times 10^6$ pascals (Pa) to obtain satisfactory deformation-mitigating capability and create a satisfactory bond between the viscoelastic layer and other layers.

A block copolymer containing a saturated polyolefin block and an aromatic vinyl monomer block (hereafter, simply "block copolymer") can also be used. Such a block copolymer will contain a block constituted by a polyolefin containing substantially no double or triple carbon-carbon bonds, and a block constituted by an aromatic vinyl monomer. At least 90% of the carbon-carbon bonds in the saturated polyolefin block are preferably single bonds. Examples of aromatic vinyl monomers include styrene, p-methylstyrene, α-methylstyrene, indene, and the like. These may be used singly or in combinations of two or more types. Examples of block copolymers include styrene-ethylene-propylene-styrene block copolymers, styrene-ethylene-propylene block copolymers, styrene-ethylene-butylene-styrene block copolymers, and the like.

An amorphous saturated polyolefin block may also be used. If an amorphous saturated polyolefin block is used, the shear storage modulus G' of the viscoelastic layer at 0 to 40° C. can be adjusted, for example, to about $1.5 \times 10^4$ to about $5.0 \times 10^6$ pascals (Pa) to obtain satisfactory deformation-mitigating capability and create a satisfactory bond between the viscoelastic layer and other members.

The proportions of the saturated polyolefin and/or the block copolymer can be about 2 parts by mass to about 40 parts by mass per 100 parts by mass of the (meth)acrylic (co)monomer. An amount of at least about 2 parts by mass will yield a viscoelastic layer having a low temperature dependency, and an amount of no more than about 40 parts by mass will yield satisfactory weather resistance, which is advantageous in terms of reliability over extended usage and bond strength with respect to other members.

The weight-average molecular weight of the (meth)acrylic (co)polymer can be within a range from about 10,000 to about 2,000,000. Such a range is advantageous in that it will yield an advantageous viscoelastic layer in terms of high elastic modulus and reliability over extended usage.

In addition to the polymers described above, the viscoelastic layer may also contain a tackifying resin, such as a rosin-based resin, modified rosin-based resin (such as a hydrogenated rosin-based resin, disproportionated rosin resin, or polymerized rosin-based resin), terpene resin, terpene phenolic resin, aromatic modified terpene resin, $C_5$ or $C_9$ petroleum resin, coumarone resin, or the like. A normally used additive, such as a thickening agent, thixotropic agent, extender, or filler, may also be included.

More specific examples of viscoelastic materials that can be used in the viscoelastic layer are disclosed, for example, in Japanese Unexamined Patent Application Publication Nos. 2009-249485 and 2006-028224.

If the viscoelastic layer is too thin, the non-stretchable layer may be deformed by the deformation of the stretchable layer. Conversely, if the layer is too thick, the first pattern image and the second pattern image may shift depending on the observation angle, reducing the visibility of the Moiré pattern. In one aspect, the viscoelastic layer has a thickness of about 100 μm to about 1.5 mm, or about 500 μm to about 1.0 mm.

The sheet may further comprise an additional layer in addition to the stretchable layer, non-stretchable layer, and viscoelastic layer, such as the previously described adhesive layer. Typically, the adhesive layer is a layer of pressure-sensitive adhesive containing an adhesive polymer, with examples including a single-layered pressure-sensitive adhesive film, a double-sided adhesive sheet comprising two pressure-sensitive adhesive layers, or the like.

The adhesive layer can be formed, for example, from a coating of adhesive containing an adhesive polymer. A preferred adhesive contains an adhesive polymer and a crosslinking agent that crosslinks with the adhesive polymer. In the present disclosure, "adhesive polymer" refers to a polymer that exhibits adhesiveness at ordinary temperatures (about 25° C.). Examples of adhesive polymers include acrylic polymers, polyurethane, polyolefin, polyester, and the like.

In one aspect, the stretchable layer exhibits a tensile strength of at least 0.5 MPa and no more than 100 MPa and an elongation of at least 3% and no more than 200% when the sheet is subjected to a tensile test. In one aspect, the non-stretchable layer exhibits a tensile strength of at least 50 MPa and no more than 350 MPa and an elongation of at least 1% and no more than 200% when the sheet is subjected to a tensile test. In one aspect, the viscoelastic layer exhibits a tensile strength of at least 0.01 MPa and no more than 100 MPa and an elongation of at least 10% and no more than 3,000% when the sheet is subjected to a tensile test.

Tensile strength and elongation are measured according to JIS K 6251 (2010 version/ISO 37) under the following conditions.
Measurement sample shape: dumbbell shape No. 3 set forth in JIS K 6251
Elastic stress rate: 300 mm/min
Measurement temperature: 23±1° C.

The tensile strength T (unit: MPa) is determined according to the following formula by measuring the maximum tensile force F (unit: N) until the layers of the measurement sample break and the cross-sectional area A (unit: $mm^2$) of the layers of the measurement sample.

$$T=F/A$$

Elongation E (unit: %) is determined according to the following formula by measuring an inter-bench mark distance L1 (unit: mm) at breakage of the layers of the measurement sample and an inter-bench mark distance L0 (25 mm).

$$E=(L1-L0)/L0\times100$$

Ordinarily, when the sheet according to the present disclosure is subjected to the above-described tensile test, the layers will successively break; in an exemplary aspect, the layers will break in the order of the non-stretchable layer, the viscoelastic layer, and the stretchable layer. Therefore, the tensile strength and elongation values measured for each of the layers according to the method described above will include contribution from other layers; in the present disclosure, such measured values are defined as the tensile strength and the elongation of the layers of the sheet.

In one aspect, the stretchable layer will break before the non-stretchable layer when only the stretchable layer of the sheet is drawn in an in-plane direction of the sheet. This can be confirmed by the fact that the stretchable layer breaks before the non-stretchable layer in the displacement measurement method described above with reference to FIG. 4.

In one aspect, the elongation of the non-stretchable layer is from 0 to 35% that of the stretchable layer when the stretchable layer breaks. This ratio can be evaluated as the ratio of the elongation of the stretchable layer and the elongation of the non-stretchable layer when the stretchable layer breaks in the displacement measurement method described above with reference to FIG. 4. Such a ratio contributes to satisfactorily accurate evaluation of the displacement level of the object using the Moiré pattern.

In one aspect, the surface of the side of the sheet upon which the deformation-conforming section is disposed is adhesive with respect to the object. This adhesiveness can be imparted via the adhesiveness of the deformation-conforming section (e.g., stretchable layer) itself, or by a separate adhesive layer. One aspect of an adhesive layer is as described above. The adhesive property of the surface of the side of the sheet upon which the deformation-conforming section is disposed as measured according to JIS K 5600 (ISO 2409) is, for example, at least about 1.0 $N/cm^2$ in the shear direction in terms of adhesive strength with respect to a mortar plate. Such an adhesive property is advantageous in terms of satisfactorily affixing the sheet to an object when the object is, for example, concrete, metal, or the like.

In one aspect, substantially all parts of the sheet according to the present disclosure apart from the first and second pattern images are formed from a transparent material.

Another aspect of the present disclosure provides a structural deformation-evaluating article comprising the sheet according to the present disclosure described above.

In a typical aspect, the structural deformation-evaluating article comprises an adhesive surface for bonding the structural deformation-evaluating article and an object. The adhesive surface may be the surface of the side of the sheet according to the present disclosure upon which the deformation-conforming section is disposed. Alternatively, the structural deformation-evaluating article may be provided in the form of a combination of the sheet according to the present disclosure and an adhesive. In such cases, the sheet can be bonded to the object by the adhesive when the sheet is used. Alternatively, a structural deformation-evaluating article constituted by the sheet according to the present disclosure can be provided, and the structural deformation-evaluating article can be affixed to an object using a separate conventionally known adhesive. As discussed above, the structural deformation-evaluating article according to the present disclosure can be provided in any form capable of being affixed to an object.

The capability of the sheet according to the present disclosure to three-dimensionally evaluate the location and degree of displacement that has occurred in an object can be used to evaluate the displacement of various types of objects. The sheet according to the present disclosure can be applied to objects of various materials and a wide range of shapes; in particular, concrete surfaces (such as concrete walls), metal surfaces, and the like of structures are contemplated as objects. The sheet according to the present disclosure can be especially advantageously used to evaluate object deformation or damage-induced displacement, but can also be used in other applications, such as decorative applications taking advantage of the first and second pattern images and the Moiré pattern formed thereby.

The Moiré pattern formed by the first and second pattern images can be evaluated using a conventionally known apparatus and method. By photographing, for example, the Moiré pattern using a 3D camera or other photography device and analyzing the obtained image using suitable image analysis software, the displacement of the deformation-conforming section can be three-dimensionally evaluated on the basis of the Moiré pattern, allowing displacement that has occurred in the object to be evaluated in three dimensions. The method used to photograph the pattern can be selected as appropriate; for example, if the difference in pitch between the first and second pattern images generates a Moiré pattern, the magnification can be set to the square of the value yielded by dividing the pitch of the first and second pattern images by the deviation between the two pattern images. For example, if one of the first and second pattern images has a pitch of 0.5 mm and the other has a pitch of 0.4 mm, magnification can be set to 25×; and if one of the first and second pattern images has a pitch of 0.5 mm and the other has a pitch of 0.45 mm, magnification can be set to 100×. A person skilled in the art will understand, in view of common technical knowledge, that if, for example, one of the first and second pattern images has a pitch of 0.5 mm and the other has a pitch of 0.45 mm, a Moiré pattern having a pitch of $(0.5/(0.5-0.45))^2$ mm will be observed.

EXAMPLES

The present disclosure will now be described in further detail using examples, but the present disclosure is not limited to these examples.

Example 1

<Sheet Configuration>
Deformation-non-conforming section (non-stretchable layer): Transparent, colorless, 100 µm-thick PET film (PLUS IT-120 PF 45-035, obtainable from Plus Corporation (Minato-ku, Tokyo); transmittance of unprinted areas (where grid pattern image is not printed): 99% (as measured using an NDH 2000 haze meter manufactured by Nippon Denshoku Industries Co., Ltd. (Bunkyo-ku, Tokyo); likewise hereafter)) printed with grating (grid with pitch of 0.5 mm×0.5 mm)

Deformation-mitigating section (viscoelastic layer): Transparent, colorless, 1.0 mm-thick acrylic viscoelastic piece (2EHA/Irg 651/1,6-hexanediol diacrylate ratio (molar)=100:0.14:0.08; Tg=−70° C. (as measured using a TA Instruments Q2000); transmittance: 99%)

Deformation-conforming section (stretchable layer): Transparent, colorless, 150 µm-thick stretchable tape (3M® inkjet printer label 29297, available from Sumitomo 3M (Shinagawa-ku, Tokyo); transmittance of unprinted sections (where grid pattern image is not printed): 99%) printed with grating (grid with pitch of 0.5 mm×0.5 mm)

<Manufacturing Sheet>
The acrylic viscoelastic piece was bonded to the grating-printed surface of the PET film, then the grid-printed surface of the stretchable tape was bonded to the surface of the acrylic viscoelastic piece not bonded to the PET film to obtain a sheet according to Example 1.

<Tensile Test>
A tensile test was performed upon the PET film, acrylic viscoelastic piece, and stretchable tape used, as well as the obtained sheet, according to JIS K 6251. During the tensile test of the sheet, the PET film, acrylic viscoelastic piece, and stretchable tape broke in that order. The results are shown in Table 1.

TABLE 1

Layer tensile tests

| | Maximum tensile strength (N) | Elongation (mm) | Tensile strength (MPa) | Elongation (%) |
| --- | --- | --- | --- | --- |
| PET film | 87 | 29 | 174 | 145 |
| Acrylic viscoelastic piece | 2.3 | 520 | 0.418182 | 2600 |
| Stretchable tape | 3.35 | 22.5 | 8.933333 | 112.5 |

TABLE 2

Sheet tensile test

| | Maximum tensile strength (N) | Elongation (mm) | Tensile strength (MPa) | Elongation (%) |
| --- | --- | --- | --- | --- |
| PET film | 104 | 30 | 208 | 150 |
| Acrylic viscoelastic piece | 1.05 | 46 | 0.190909 | 230 |
| Stretchable tape | 77.5 | 7.5 | 206.6667 | 37.5 |

<Sheet Deformation Test, and Displacement Evaluation Test>

Figure 5A:
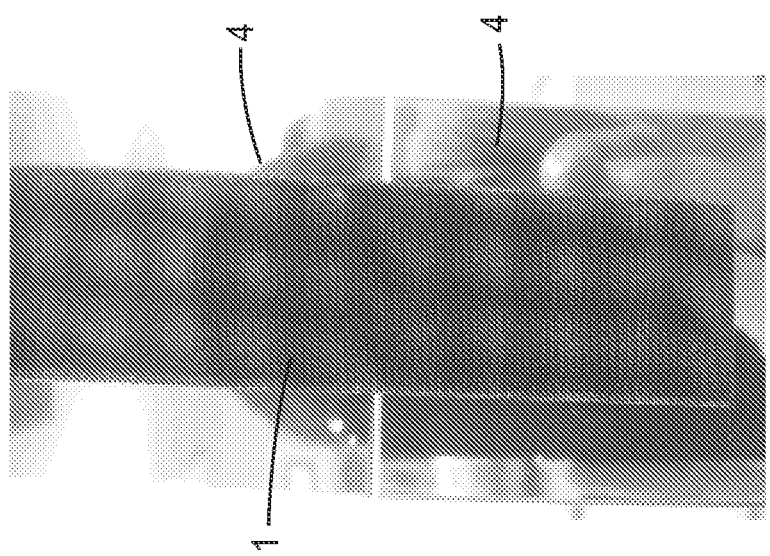
FIGS. 5A and 5B are pictures explaining a displacement evaluation test in an Example 1.
Figure 5B:
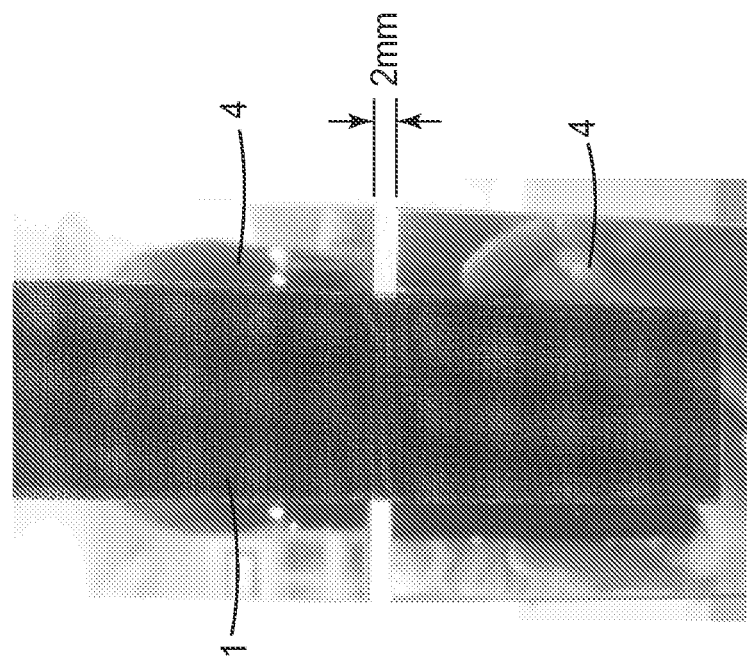

Referring to FIGS. 4 and 5, a deformation test was performed according to the previously described method. Two stainless steel plates 4 of length 100 mm×width 50 mm were prepared. The sheet was cut to length 100 mm×width 25 mm. The surface of the stretchable tape side of the sheet 1 was bonded astride the plates 3 constituted by the two stainless steel plates 4. The two stainless steel plates were gripped using pneumatic clamps, and were drawn in the directions indicated by the arrows A in FIG. 4A using a tensile testing apparatus. The stretchable tape broke when a distance of 2 mm between the stainless steel plates was reached. The maximum tensile strength of the stretchable tape was about 2.67 MPa. When further tension was applied, the stretchable tape and the viscoelastic layer were separated at their interface, at which point the test was ended. Measurement of the length L1 of the PET film at both the breakage of the stretchable tape broke and the above-described interfacial separation showed that the length was 100 mm in both cases, with a difference of 0.0 mm from the length prior to testing. It was thus confirmed that no displacement of the PET film occurred. The Moiré pattern yielded when the distance between the stainless steel plates was 2 mm was remotely (30 cm from the sheet) observed with the naked eye (see FIG. 5B). It was clearly observable that a Moiré pattern had formed at the section between the two stainless steel plates compared to before testing (see FIG. 5A), confirming that locations of displacement in an object can be detected using Moiré patterns.

INDUSTRIAL APPLICABILITY

The sheet according to the present disclosure can be used by affixing to a desired object for which displacement evaluation is required in order to conveniently and quantitatively measure the displacement of the object in three dimensions. The sheet is especially useful in applications for structural deformation-evaluating articles.

EXEMPLARY EMBODIMENTS

Item 1. A sheet comprising:
a deformation-conforming section comprising a first pattern image;
a deformation-non-conforming section comprising a second pattern image; and
a deformation-mitigating section disposed between the deformation-conforming section and the deformation-non-conforming section;
the first pattern image being visible through the second pattern image.

Item 2. The sheet according to Item 1, wherein a proportion of a displacement of the deformation-non-conforming section is no more than 30% per 100% displacement of the deformation-conforming section.

Item 3. The sheet according to Item 1 or 2, wherein the deformation-conforming section comprises a stretchable layer comprising the first pattern image, the deformation-non-conforming section comprises a non-stretchable layer comprises the second pattern image, and the deformation-mitigating section comprises a viscoelastic layer.

Item 4. The sheet according to Item 3, wherein, when the sheet is subjected to a tensile test, the stretchable layer exhibits a tensile strength of at least 0.5 MPa and no more than 100 MPa, and an elongation of at least 3% and no more than 200%, the non-stretchable layer exhibits a tensile strength of at least 50 MPa and no more than 350 MPa, and an elongation of at least 1% and no more than 200%, and the viscoelastic layer exhibits a tensile strength of at least 0.01 MPa and no more than 100 MPa, and an elongation of at least 10% and no more than 3,000%.

Item 5. The sheet according to Item 3 or 4, wherein, when only the stretchable layer is drawn in an in-plane direction of the sheet, the stretchable layer breaks before the non-stretchable layer breaks.

Item 6. The sheet according to Item 5, wherein, when the stretchable layer breaks, the non-stretchable layer has an elongation of 0 to 35% relative to an elongation of the stretchable layer.

Item 7. The sheet according to any one of Items 3 to 6, wherein the stretchable layer contains at least one type of polymer selected from the group consisting of polystyrene, polyolefin, olefin copolymers, vinyl copolymers, (meth) acrylic polymers, (meth)acrylic copolymers, and polyurethane.

Item 8. The sheet according to Item 7, wherein the stretchable layer contains (A) a carboxy group-containing (meth) acrylic copolymer and (B) an amino group-containing (meth)acrylic copolymer at an (A):(B) mass ratio of 10:90 to 90:10.

Item 9. The sheet according to any one of Items 3 to 8, wherein the non-stretchable layer contains at least one type of polymer selected from the group consisting of polyester, polyolefin, polyvinyl, polystyrene, polyacrylate, polymethacrylate, polyimide, polyurethane, polysulfone, polyether, polyacetal, polyphenylene, polyepoxy resins, phenolic resins, nylon, and polycarbonate.

Item 10. The sheet according to any one of Items 3 to 9, wherein the viscoelastic layer contains at least one type of polymer selected from the group consisting of polyolefin, olefin copolymers, vinyl copolymers, (meth)acrylic polymers, (meth)acrylic copolymers, polyurethane, and silicone polymers.

Item 11. The sheet according to any one of Items 1 to 10, wherein the deformation-non-conforming section exhibits displacement of 3 mm or less when the deformation-conforming section is displaced 10 mm.

Item 12. A structural deformation-evaluating article comprising the sheet described in any one of Items 1 to 11.

What is claimed is:

1. A sheet comprising:
a deformation-conformable section comprising a stretchable layer and a first printed pattern image;
a deformation-non-conformable section comprising a transparent non-stretchable layer and a second printed pattern image; and
a deformation-mitigating section disposed between the deformation-conformable section and the deformation-non-conformable section, the deformation-mitigating section comprising a transparent viscoelastic layer;
the first pattern image being visible through the second pattern image such that a Moiré pattern is formed by the first printed pattern image and the second printed pattern image,
wherein when only the stretchable layer is drawn in an in-plane direction of the sheet, the stretchable layer breaks before the non-stretchable layer breaks.

2. The sheet according to claim 1, wherein a proportion of a displacement of the deformation-non-conforming section is no more than 30% per 100% displacement of the deformation-conforming section.

3. The sheet according to claim 1, wherein
the stretchable layer exhibits a tensile strength of at least 0.5 MPa and no more than 100 MPa, and an elongation of at least 3% and no more than 200%,
the non-stretchable layer exhibits a tensile strength of at least 50 MPa and no more than 350 MPa, and an elongation of at least 1% and no more than 200%, and
the viscoelastic layer exhibits a tensile strength of at least 0.01 MPa and no more than 100 MPa, and an elongation of at least 10% and no more than 3,000%.

4. The sheet according to claim 1, wherein, when the stretchable layer breaks, the non-stretchable layer has an elongation of 0 to 35% relative to an elongation of the stretchable layer.

5. The sheet according to claim 1, wherein the stretchable layer contains at least one type of polymer selected from the group consisting of polystyrene, polyolefin, olefin copolymers, vinyl copolymers, (meth)acrylic polymers, (meth) acrylic copolymers, and polyurethane.

6. The sheet according to claim 5, wherein the stretchable layer contains (A) a carboxy group-containing (meth)acrylic copolymer and (B) an amino group-containing (meth)acrylic copolymer at an (A):(B) mass ratio of 10:90 to 90:10.

7. The sheet according to claim 1, wherein the non-stretchable layer contains at least one type of polymer selected from the group consisting of polyester, polyolefin, polyvinyl, polystyrene, polyacrylate, polymethacrylate, polyimide, polyurethane, polysulfone, polyether, polyacetal, polyphenylene, polyepoxy resins, phenolic resins, nylon, and polycarbonate.

8. The sheet according to claim 1, wherein the viscoelastic layer contains at least one type of polymer selected from the group consisting of polyolefin, olefin copolymers, vinyl copolymers, (meth)acrylic polymers, (meth)acrylic copolymers, polyurethane, and silicone polymers.

9. The sheet according to claim 1, wherein the deformation-non-conforming section exhibits displacement of 3 mm or less when the deformation-conforming section is displaced 10 mm.

10. A structural deformation-evaluating article comprising the sheet described in claim 1.

* * * * *